(12) United States Patent
Tastl et al.

(10) Patent No.: US 10,926,528 B2
(45) Date of Patent: Feb. 23, 2021

(54) COLOR CALIBRATION FOR THREE-DIMENSIONAL PRINTING

(71) Applicant: Hewlett-Packard Development Company, L.P., Houston, TX (US)

(72) Inventors: Ingeborg Tastl, Palo Alto, CA (US); Nathan Moroney, Palo Alto, CA (US); Peter Morovic, Sant Cugat del Valles (ES); Jan Morovic, Colchester (GB); Andrew E Fitzhugh, Palo Alto, CA (US); Jacob Tyler Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 394 days.

(21) Appl. No.: 15/570,365

(22) PCT Filed: Jul. 30, 2015

(86) PCT No.: PCT/US2015/042981
§ 371 (c)(1),
(2) Date: Oct. 30, 2017

(87) PCT Pub. No.: WO2017/019100
PCT Pub. Date: Feb. 2, 2017

(65) Prior Publication Data
US 2018/0141324 A1    May 24, 2018

(51) Int. Cl.
*B33Y 50/02* (2015.01)
*B33Y 30/00* (2015.01)
(Continued)

(52) U.S. Cl.
CPC ............ *B33Y 50/02* (2014.12); *B29C 64/112* (2017.08); *B29C 64/393* (2017.08); *B33Y 10/00* (2014.12); *B33Y 30/00* (2014.12)

(58) Field of Classification Search
USPC .......................................................... 264/239
See application file for complete search history.

(56) References Cited

U.S. PATENT DOCUMENTS 7,817,167 B2    10/2010    Suzuki et al.
8,416,236 B1     4/2013    Hickman et al.
(Continued)

FOREIGN PATENT DOCUMENTS

EP       1252867 A1    10/2002
JP       2002292752    10/2002
(Continued)

OTHER PUBLICATIONS

"Manufacturing Guide: Laminated Object Manufacturing, LOM" (Available on Mar. 16, 2015, <http://www.custompartnet.com/wu/laminated-object-manufacturing>). (Year: 2015).*
(Continued)

*Primary Examiner* — Matthew J Daniels
*Assistant Examiner* — Hana C Page
(74) *Attorney, Agent, or Firm* — HP Inc. Patent Department

(57) ABSTRACT

Examples analyze three-dimensional printing specifications associated with a three-dimensional printing device to determine test angles for a test object and test surfaces corresponding to the test angles for the test object. Examples generate the test object for color calibration for the three-dimensional printing device based at least in part on the test angles and test surfaces that are configured with at least one test color.

11 Claims, 12 Drawing Sheets

(51) Int. Cl.
   *B29C 64/393*   (2017.01)
   *B33Y 10/00*    (2015.01)
   *B29C 64/112*   (2017.01)

(56)                References Cited

U.S. PATENT DOCUMENTS 10,071,527 B2 *  9/2018  Travers .................. G06F 17/50
   2004/0080078 A1  4/2004  Collins
   2004/0200816 A1  10/2004 Chung et al.
   2012/0287449 A1 * 11/2012 Kim ...................... H04N 1/506
                                                      358/1.9
   2014/0257549 A1  9/2014  Swartz et al.
   2015/0134096 A1  5/2015  Travers et al.

FOREIGN PATENT DOCUMENTS

JP          2004151104         5/2004
   JP          2015098091         5/2015
   WO      WO-2013-021173 A       2/2013
   WO      WO-2014-015994 A1      1/2014
   WO       WO-2015072155         5/2015
   WO       WO-2016119902         8/2016

OTHER PUBLICATIONS

English Translation of Kondo (JP2002292752) (Year: 2002).*
Parraman, C et al, "Specifying Colour and Maintaining Colour Accuracy for 3D Printing", Jan. 27, 2008.

* cited by examiner

COLOR CALIBRATION FOR THREE-DIMENSIONAL PRINTING

BACKGROUND

A printing device, such as a printer, multifunction printer, and/or other such devices may be used to print content onto a physical medium, such as paper. For a three-dimensional printing device, consumable fluids or other materials may be deposited to form a three-dimensional object.

DRAWINGS

FIGS. 7A-G provide diagrammatic illustrations of example test objects.

Figure 8A:
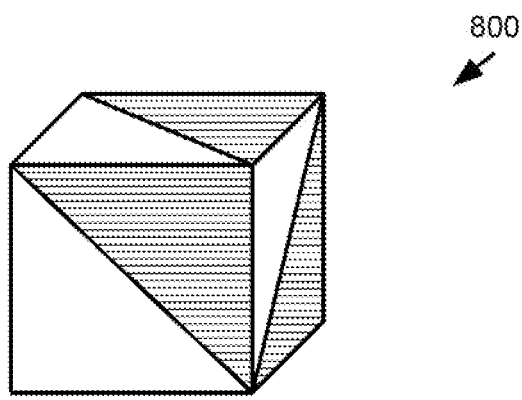

FIG. 8A provides a diagrammatic illustration of an example test object.

Figure 8B:
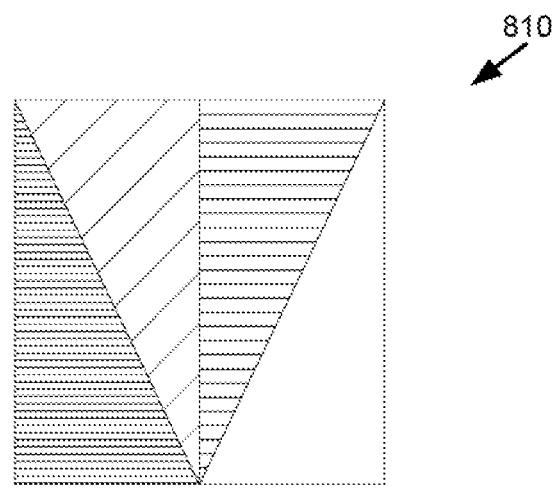

FIG. 8B provides a diagrammatic illustration of an example test surface.

Figure 8C:
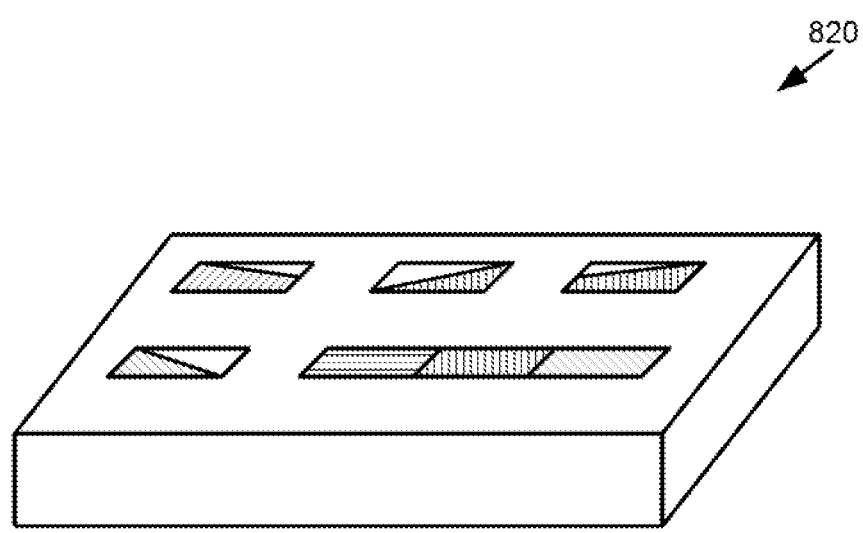

FIG. 8C provides a diagrammatic illustration of an example test object.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

In some computing systems, such as three-dimensional (3D) printing devices, three-dimensional objects may be formed by performing a layer-wise additive manufacturing process that deposits/apples consumable fluids or other material onto a powder-based build material. In general, consumable fluids (e.g., ink, toner, binding fluids, colourants, and/or other such consumable fluids), powders, and/or other materials used in a printing process, such a three-dimensional printing process, may be referred to as printing materials.

In some 3D printing processes and/or devices, one or more layers of the additive manufacturing process may correspond to coloring a 3D printed object. However, in some examples, color of a 3D printed object may vary visually based at least in part on angles of surfaces of the 3D object. In other words, some colors may have angular color dependency characteristics that may affect visual appearance of the color for some 3D printed objects. Generally, as described herein, an angle generally refers to one or more angles (e.g., one angle, two angles, three angles, etc.) of a surface normal for a surface. Furthermore, while values of angles may be used in some examples, generally such angular values may merely describe a relative relationship of surface normals, surfaces, and/or angles.

Examples of computing devices, methods, processes, and/or executable instructions stored/encoded in non-transitory machine-readable storage mediums may facilitate analysis of 3D printing devices and/or processes to generate 3D test objects, and examples may analyze 3D test objects to determine angular color dependency characteristics based on such 3D test objects. In some examples, 3D color calibration data for a 3D printing device may be generated, and the 3D color calibration data may be used during printing with the 3D printing device to thereby compensate for angular color dependency characteristics. Therefore, by controlling a 3D printing device and/or process based at least in part on the 3D color calibration data, examples may facilitate printing of approximately uniform visual color characteristics for 3D objects printed by the 3D printing device and/or process.

In some examples, the three-dimensional (3D) color calibration data for a 3D printing device may correspond to a 3D angular color dependency model for one or more primary colors used for 3D printing. Generally the 3D color calibration data may indicate angular color dependency characteristics that may be used to control deposition/application of one or more layers associated with one or more colors such that the colors may appear visually uniform for various surface orientations. For example, the 3D color calibration data may indicate an amount of printing material to apply for a given surface normal angle relative to other surface normal angles to produce an approximately uniform visual appearance.

Figure 1A:
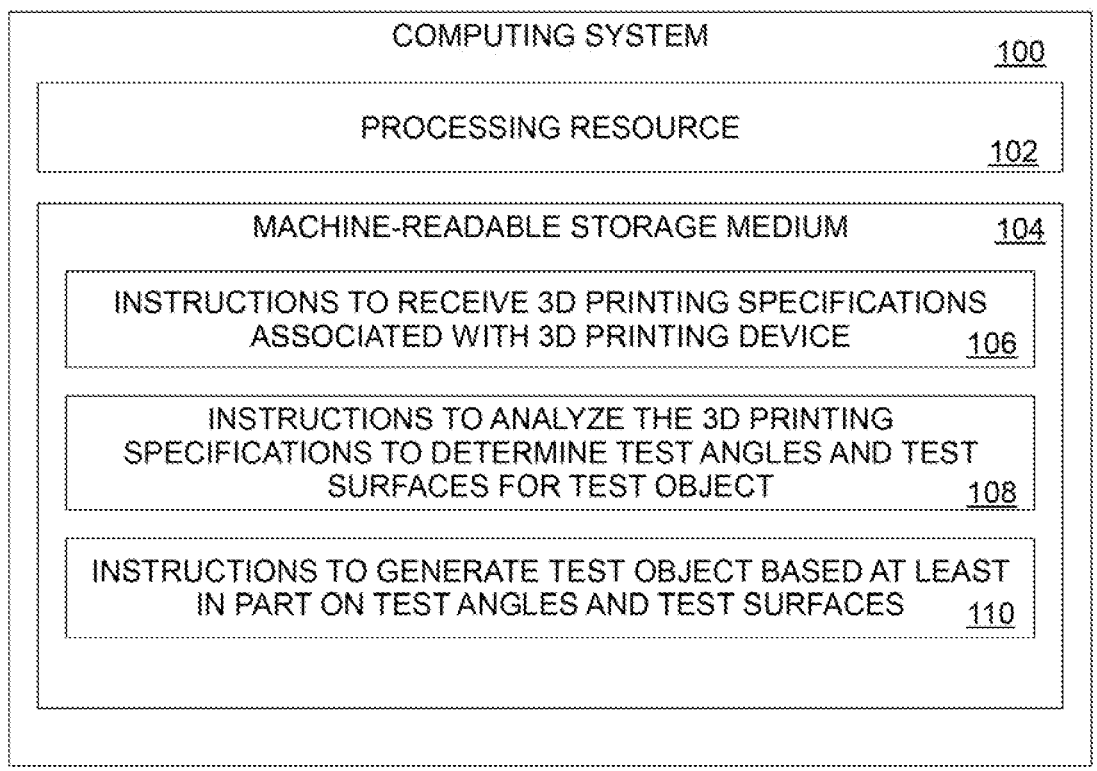
FIG. 1A is a block diagram of an example computing system.
Figure 1B:
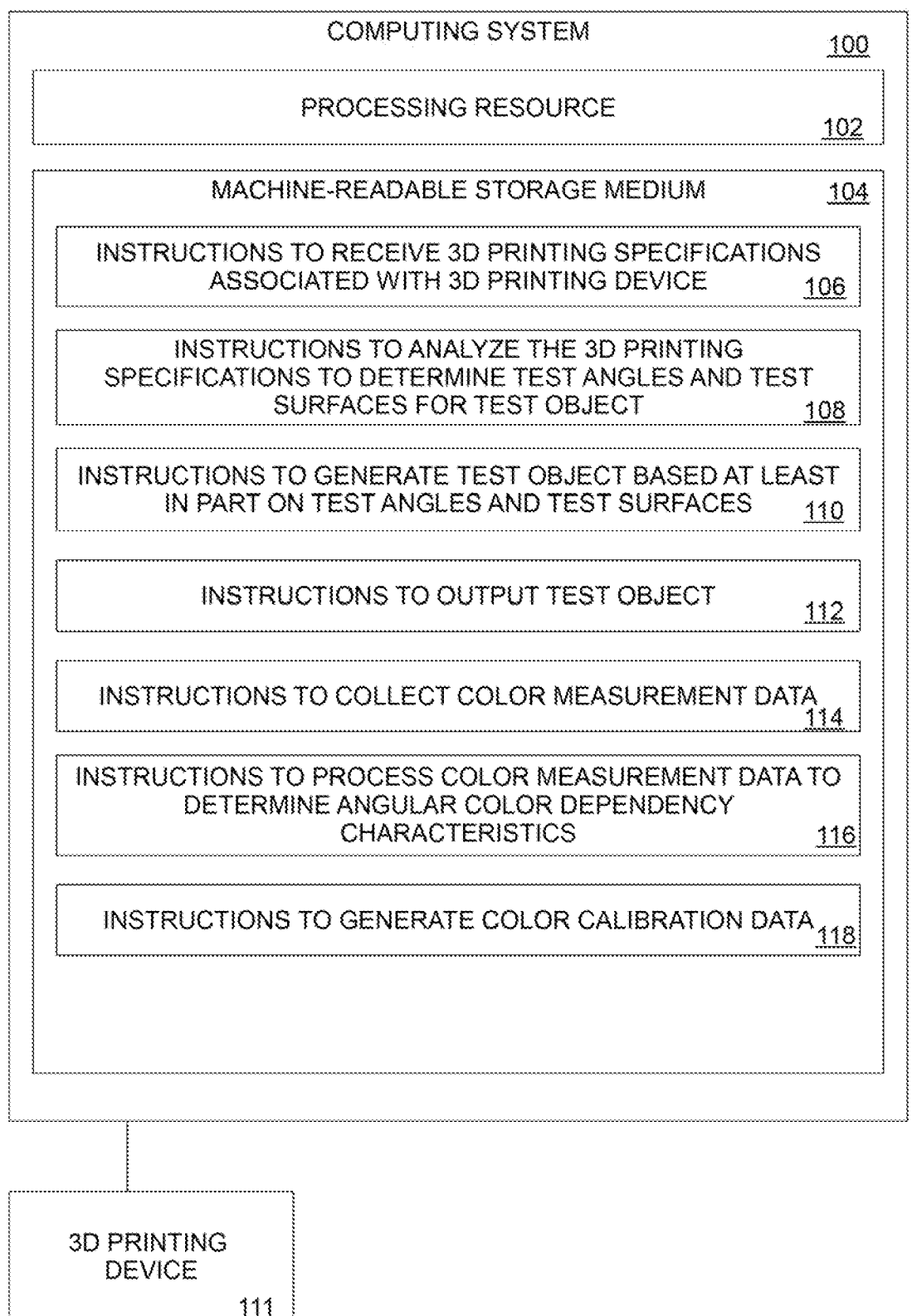
FIG. 1B is a block diagram of an example computing system.

Tuning now to FIGS. 1A and 1B, these figures provides block diagrams that illustrate examples of a computing system 100. In general, an example computing system may comprise a personal computer, a portable electronic device (e.g., a smart phone, a tablet, a laptop, a wearable device, etc.), a workstation, smart device, server, a printing device (e.g., a 3D printing device), and/or any other such data processing devices. In these examples, the computing system 100 comprises a processing resource 102 and a machine-readable storage medium 104, which may be referred to as a memory and/or a memory resource. In the examples described herein, a processing resource 102 may include at least one hardware-based processor. Furthermore, the processing resource 102 may include one processor or multiple processors, where the processors may be configured in a single computing system 100 or distributed across multiple systems connected locally and/or remotely. As will be appreciated, a processing resource 102 may comprise one or more general purpose data processors and/or one or more specialized data processors. For example, the processing resource 102 may comprise a central processing unit (CPU), a graphics processing unit (GPU), an application-specific integrated circuit (ASIC), and/or other such configurations of logical components for data processing.

The machine-readable storage medium 104 may represent the random access memory (RAM) devices comprising the main storage of the example computing device 100, as well as any supplemental levels of memory, e.g., cache memories, non-volatile or backup memories (e.g., programmable or flash memories), read-only memories, mass-storage resources, etc. In addition, machine-readable storage medium 104 may be considered to include memory storage physically located elsewhere, e.g., any cache memory in a microprocessor, as well as any storage capacity used as a virtual memory, e.g., as stored on a mass storage device or on another computing device/system in communication with the example computing system 100. In some examples, the machine-readable storage medium 104 may correspond to various types of storage mediums, such as computer readable storage medium, which may include volatile and non-volatile, removable and non-removable tangible media implemented in any technology for the storage and processing of information. Computer readable and/or machine-readable storage medium may include RAM, ROM, erasable programmable read-only memory (EPROM), electrically erasable programmable read-only memory, flash memory or other solid state memory technology, portable compact disc memory, or other optical storage, or any other medium that may be used to store executable instructions and information. Furthermore, the machine-readable storage medium 104 may be non-transitory.

Generally, the machine-readable storage medium 104 may be encoded with and/or store instructions that may be executable by the processing resource 102, where execution of such instructions may cause the processing resource 102 and/or computing system 100 to perform the functionalities, processes, and/or sequences of operations described herein. In the example of FIG. 1A, the machine-readable storage medium 104 comprises instructions for generating a test object associated with a 3D printing device. In particular, the example machine-readable storage medium 104 comprises instructions to receive 3D printing specifications associated with a 3D printing device 106. The machine-readable storage medium 104 further comprises instructions to analyze the 3D printing specifications to determine test angles for a test object and test surfaces corresponding to the test angles for the test object 108. The machine-readable storage medium also comprises instructions to generate the test object for the 3D printing device based at least in part on the test angles and the test surfaces. Generally, each test surface of the test object may be configured with at least one test color.

In some examples of a computing device, such as the example computing device 100 shown in FIG. 1B, the computing device may comprise and/or be connected to a 3D printing device 111. In addition, the non-transitory machine-readable storage medium 104 may further comprise instructions to output the test object 112 to the 3D printing device 111 to thereby generate a printed test object that comprises the test surfaces oriented/positioned at the various test angles and configured with one or more test colors. In some examples, the non-transitory machine-readable storage medium 104 may comprise instructions to collect color measurement data for each test surface for the printed test object with one or more color measurement devices 114. In some examples, the machine-readable storage medium 104 may comprise instructions to process the color measurement data to determine angular color dependency characteristics for each test color and each test angle of the printed test object 116. Moreover, in some examples, the machine-readable storage medium 104 may comprise instructions to generate 3D color calibration data for the 3D printing device based at least in part on the angular color dependency characteristics of the test colors for the test angles 118.

While not shown in these examples, for interface with a user or operator, the example computing system 100 may include a user interface incorporating one or more user input/output devices, e.g., one or more buttons, a display, a touchscreen, a speaker, etc. The user interface may therefore communicate data to the processing resource 102 and receive data from the processing resource 102. For example, a user may input one or more selections via the user interface, and the processing resource 102 may cause data to be output on a screen or other output device of the user interface. Furthermore, the computing system 100 may comprise a network interface device. Generally, the network interface device comprises one or more hardware devices to communicate data over one or more communication networks, such as a network interface card. As shown, the example computing device 100 comprises a 3D printing device 111 for printing content in a layer-wise additive manufacturing process. In some examples, the computing system and/or 3D printing device 111 may comprise at least one printhead for dispensing/depositing/applying printing material in a 3D printing process.

Figure 2A:
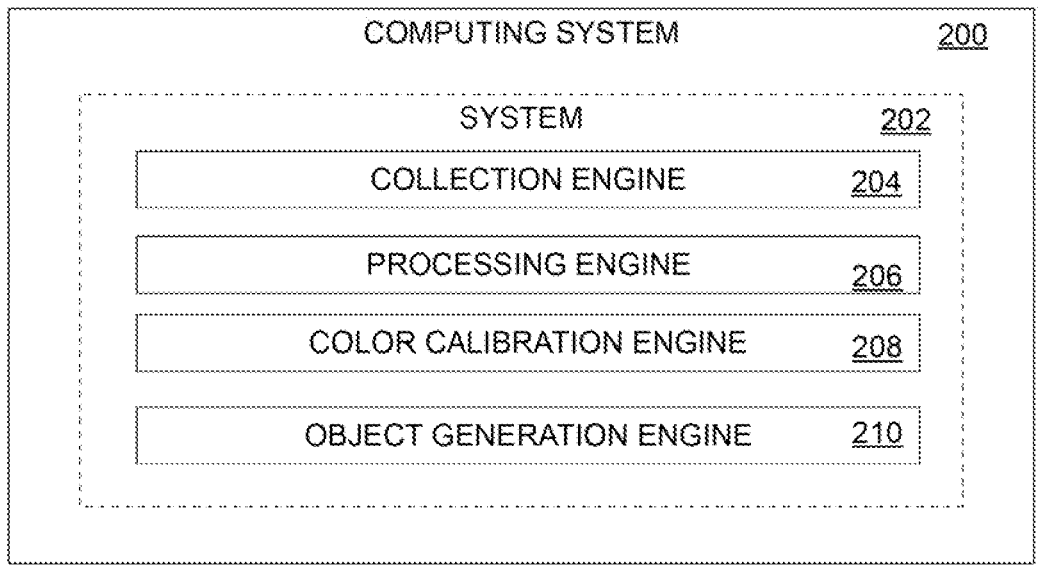
FIG. 2A is a block diagram of an example computing system.
Figure 2B:
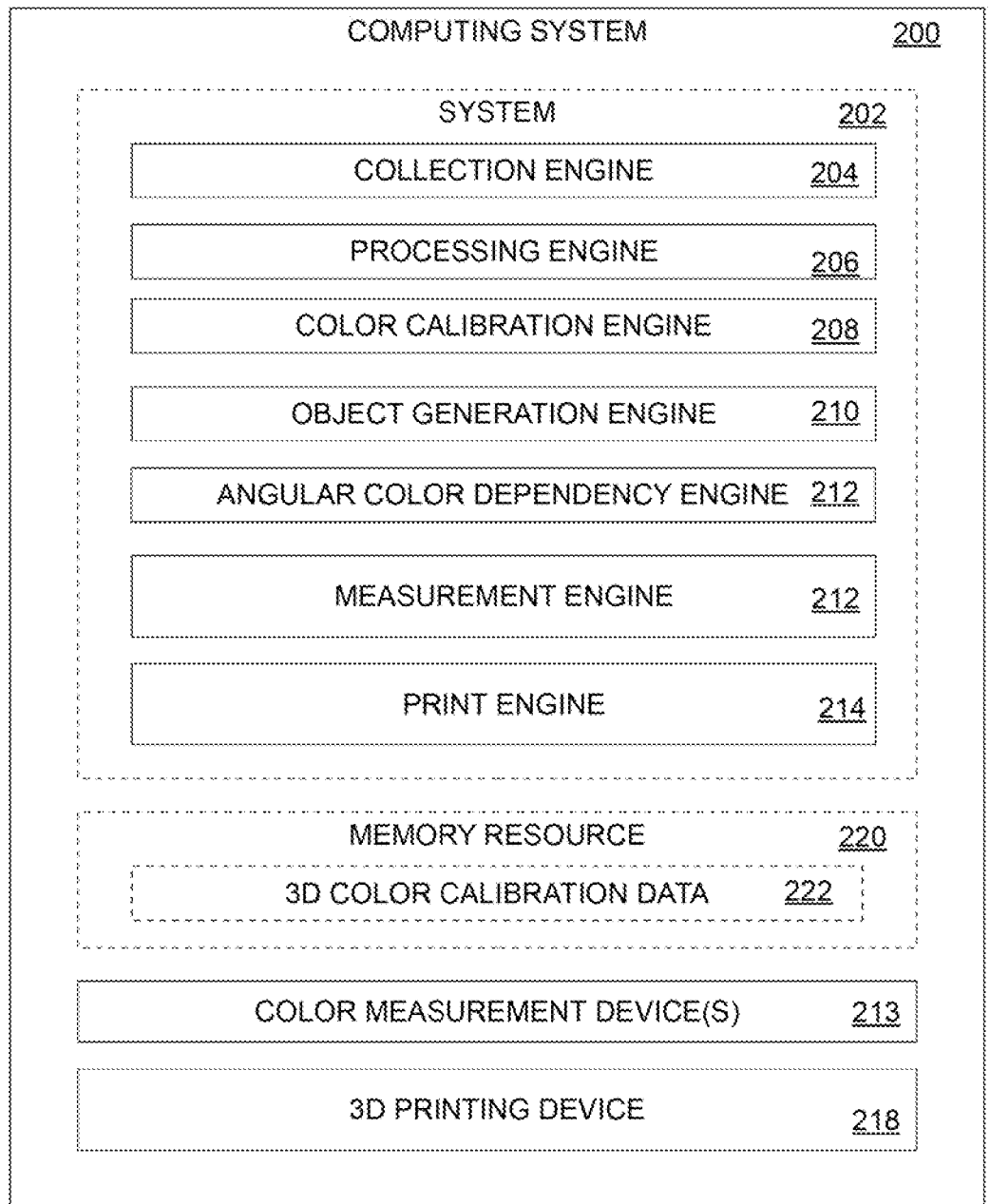
FIG. 2B is a block diagram of an example computing system.

FIGS. 2A-B provide a block diagrams of an example computing system 200. Generally, a computing system, such as the computing system 200 of FIGS. 2A-B may be a printing device, a personal computing device, a server, a computing node for a large scale data processing system (e.g., a cloud computing system), and/or other such types of data processing devices/systems. In general, engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, a computing system implementing such engines may include the machine-readable storage medium storing the instructions and the processing resource to execute the instructions, or the machine-readable storage medium may be separately stored and accessible by the computing system and the processing resource. In some examples, some engines may be implemented in circuitry.

In this example, the example computing system 200 of FIG. 2A comprises a system 202 including engines 204-210 that may analyze color measurement data and generate 3D color calibration data for a 3D printing device. Similarly, the example computing system 200 of FIG. 2B comprises a system 202 including engines 204-214. In the examples, the computing system 200 comprises a collection engine 204 to receive, from one or more color measurement devices, color measurement data collected from a printed test object. The printed test object is generally associated with color calibration of a 3D printing device, and the printed test object may comprise a plurality of test surfaces generated by the 3D printing device, where the plurality of test surfaces are positioned at a plurality of test angles, and each test surface is configured with at least one test color. In some examples, each test surface may be configured with two test colors. The computing system 200 further comprises a processing engine 206 to process the color measurement data to determine angular color dependency characteristics of the test colors for each of the test angles. In addition, the computing system 200 comprises a color calibration engine 208 to generate 3D color calibration data for the 3D printing device based at least in part on the angular color dependency characteristics. Furthermore, the example computing system 200 comprises an object generation engine 210 to generate a 3D production object for the 3D printing device configured with the at least one test color based at least in part on the 3D color calibration data. Generally, the 3D production object may correspond to an object to be produced by the 3D printing device, where visual uniformity of color may be desirable.

In addition, in some examples, such as the example computing system 200 of FIG. 2B, the computing system 200 may comprise an angular color dependency engine 212 to determine whether angular color dependency occurs for any test colors and for any test angles. As shown in FIG. 2B, some examples may comprise a measurement engine 212 to control one or more color measurement devices 213 that may be implemented in and/or connected to the computing system 200 to collect the color measurement data. In addition, in some examples, a test object support mechanism may be implemented in and/or connected to an example computing system. In these examples, the measurement engine 212 may further control rotation of the test object support mechanism during collection of the color measurement data. Some examples may further comprise a print engine 214 to control the 3D printing device to generate the printed test object. The print engine may further control the 3D printing device to generate at least one production object based at least in part on the 3D color calibration data. In some examples, the computing system 200 may comprise the 3D printing device 218 as a subsystem. Therefore, in some examples, the computing system 200 may be a 3D printing device comprising some of the engines 204-214 of FIGS. 2-B. Furthermore, in some examples, the computing system 200 may comprise a memory resource 220 that may store 3D color calibration data 222 for the 3D printing device.

Figure 3:
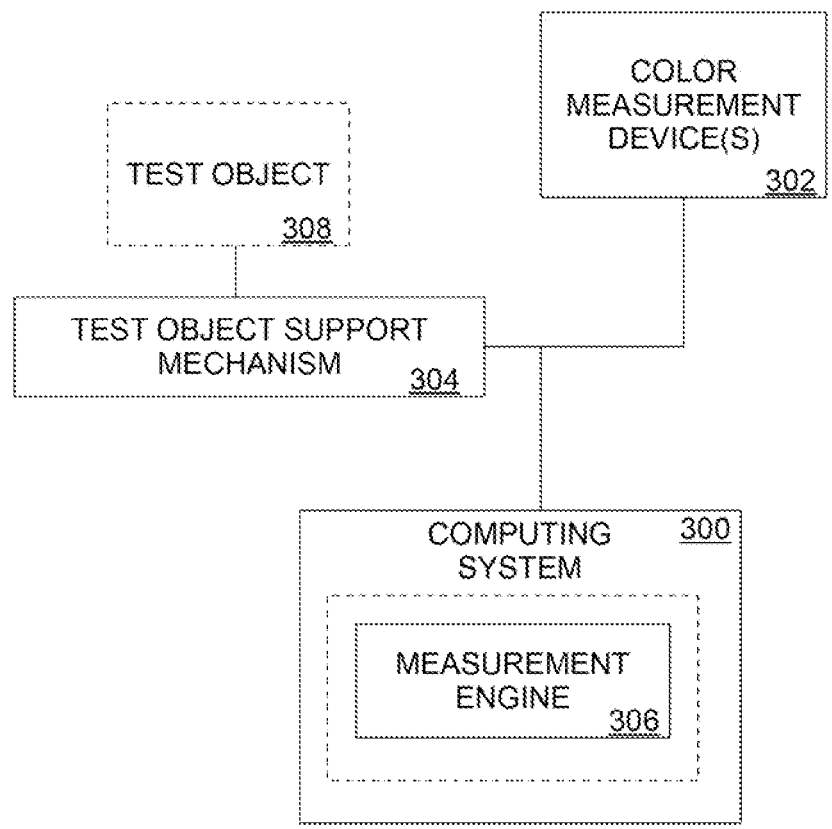
FIG. 3 is a block diagram of an example computing system.

FIG. 3 provides a block diagram that illustrates example components of an example computing system 300. In this example, the computing system 300 comprises one or more color measurement devices 302 and a test object support mechanism 304. In addition, the computing system 300 comprises a measurement engine 306 that may control the test object support mechanism 304 and the one or more color measurement devices 302. In this example, an example test object 308 is supported by the test object support mechanism 304. The test object support mechanism 304 may rotate the test object 308 about one or more axes of rotation to thereby position different test surfaces of the test object 308 for measurement by a color measurement device 302. In some examples, the test object support mechanism 304 may rotate a test object about one axis of rotation. In some examples, the test object support mechanism 304 may rotate a test object about two axes of rotation. In some examples, a color measurement device may be moved along one or more axes. Therefore, as will be appreciated, in some examples, the computing system may control movement of one or more color measurement devices and/or rotation of a test object with the test object support mechanism 304. Generally, a test surface may be positioned for measurement by a color measurement device such that color measurement data may be collected for a test angle corresponding to the test surface. In some examples, a color measurement device may comprise an imaging based measurement device that may measure color levels, such as a tele-spectrophotometer, digital camera, etc. In some examples, a color measurement device may comprise a contact-based measurement system.

Figure 4:
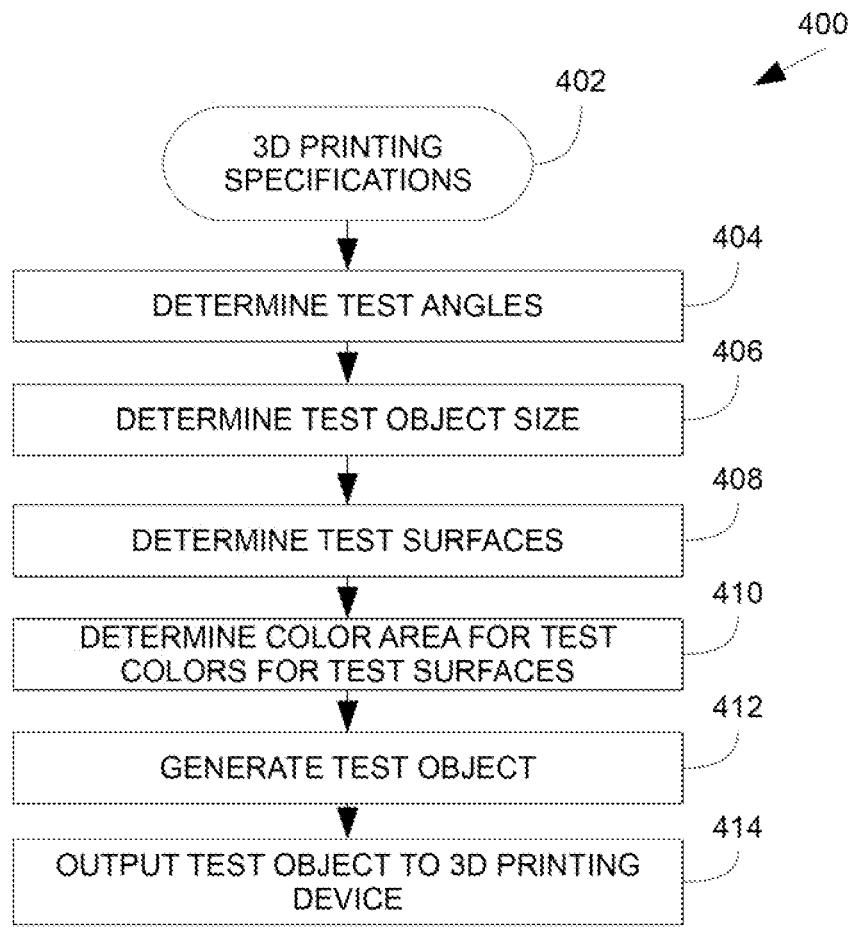
FIG. 4 is a flowchart that illustrates an example sequence of operations that may be performed by an example computing device.
Figure 5:
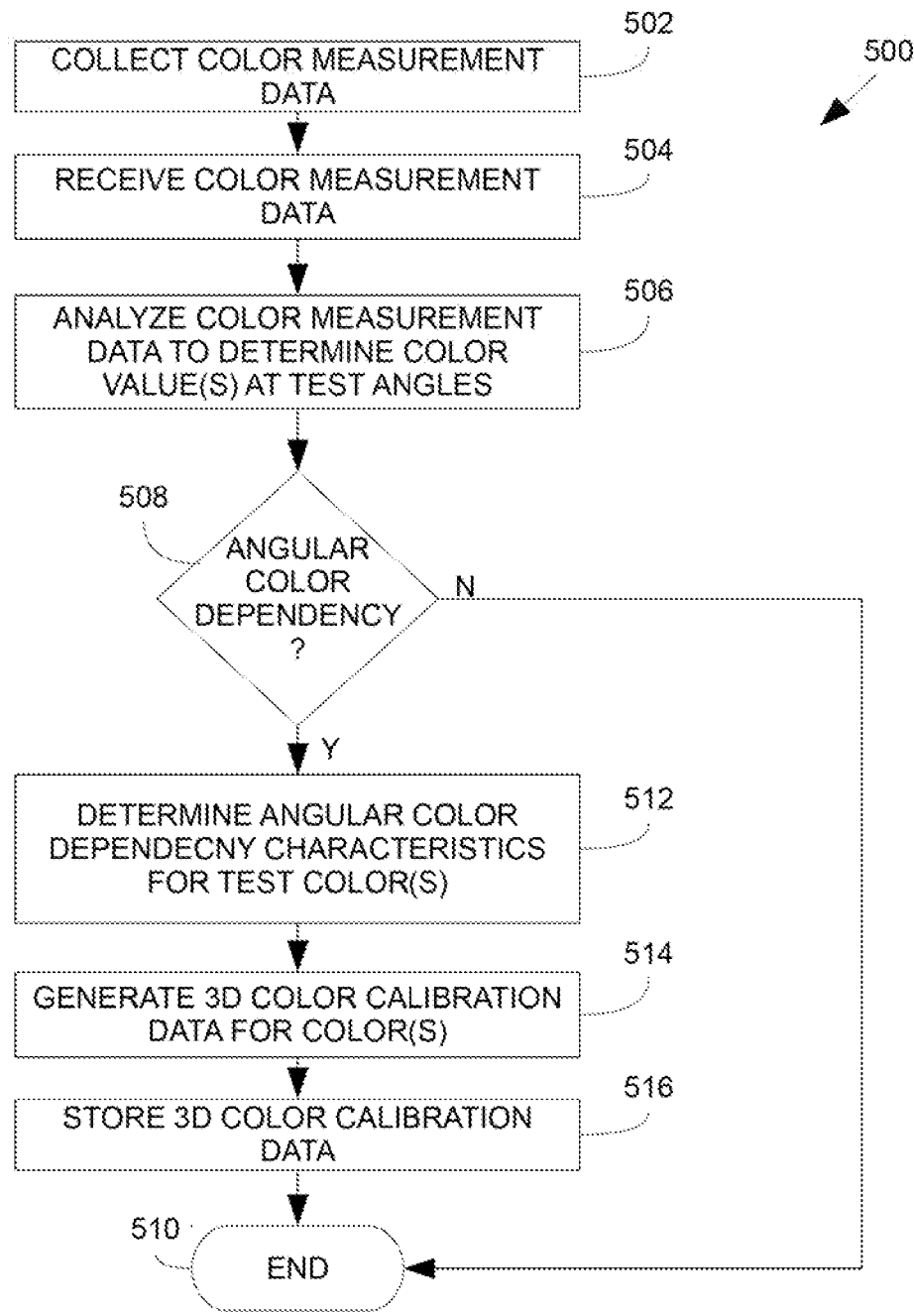
FIG. 5 is a flowchart that illustrates an example sequence of operations that may be performed by an example computing system.
Figure 6:
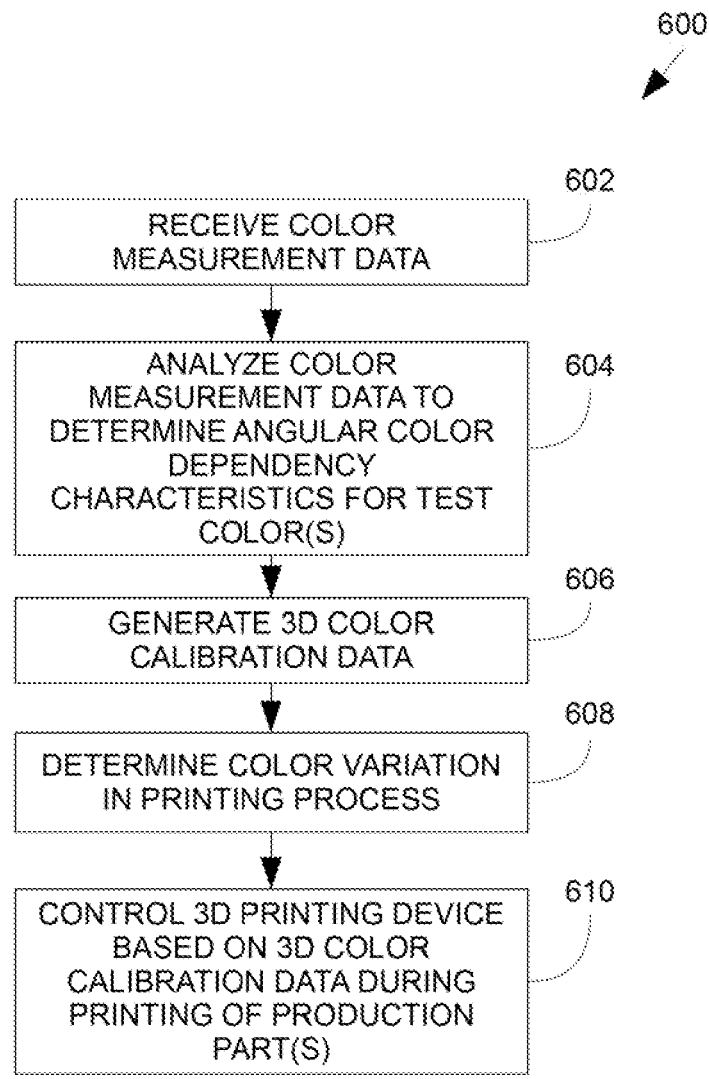
FIG. 6 is a flowchart that illustrates an example sequence of operations that may be performed by an example computing system.

FIGS. 4-6 provide flowcharts that provide example sequences of operations that may be performed by an example computing system, such as a 3D printing device, and/or a processing resource thereof to perform example processes and methods of the disclosure. In some examples, the operations included in the flowcharts may be embodied in a memory (such as the machine-readable storage medium 104 of FIG. 1) in the form of instructions that may be executable by a processing resource to cause the computing system (e.g., the computing systems 100 of FIG. 1, the computing system 200 of FIG. 2, the computing system 300 of FIG. 3, etc.) to perform the operations corresponding to the instructions. Additionally, the examples provided in FIGS. 4-6 may be embodied in computing systems, machine-readable storage mediums, processes, and/or methods. In some examples, the example processes and/or methods disclosed in the flowcharts of FIGS. 4-6 may be performed by one or more engines implemented in a computing device, such as the example engines 204-214 of FIG. 2.

FIG. 4 provides a flowchart 400 that illustrates an example sequence of operations that may be performed by a computing device based on 3D printing specifications 402. Generally, 3D printing specifications may comprise information associated with a 3D printing device, information associated with a production object to be printed by the 3D printing device, information associated with characteristics of a 3D test object, information associated with one or more color measurement devices, and/or information associated with a test object support mechanism.

For example, 3D printing specifications may indicate specifications of the 3D printing device, such as types of printing material that the 3D printing device may use, types of build materials, types of binding materials, 3D printing processes implemented and corresponding printing components (e.g., stereolithography, fused deposition modeling, selective layer sintering, selective laser melting, electronic beam melting, laminated object manufacturing, piezo inkjet based, etc.), a print bed size for the 3D printing device, and/or other information associated with characteristics of the 3D printing device. In some examples, 3D printing specifications may indicate specifications of the 3D production object to be printed by the 3D printing device, such as a size and dimensions of the 3D production object, colors of the 3D printed object, printing material composition of the 3D production object, tolerances associated with printing of the 3D production object, and/or other information associated with the characteristics of the 3D production object.

Furthermore, 3D printing specifications may comprise, for example, test angle information (e.g., number of test angles, relative orientation of test angles, etc.) for a 3D test object to be used for color calibration of the 3D printing device, test surface information (e.g., size of test surface, etc.) for a 3D test object to be used for color calibration of the 3D printing device, test color information (e.g., number of test colors, angular orientation of test colors, etc.) for one or more test colors to be used for color calibration of the 3D printing device, test object accuracy information, and/or other information corresponding to characteristics of a 3D test object. In addition, 3D printing specifications may comprise, for example, measurement specifications for each color measurement device, measurement accuracy information for a color measurement device, minimum/maximum test color area information, test bed size information, test object support mechanism specifications, and/or other such information corresponding to characteristics of components that may be used to collect and/or analyze color measurement data collected from a 3D test object.

Based on the 3D printing specifications 402, the computing system may determine test angles (block 404) for a test object to be generated and printed by a 3D printing device. Generally, the test angles determined for the test object may comprise at least two test angles, where the test angles generally correspond to relative orientations of test surfaces (which may be described as surface normal angles). As will be appreciated, the test angles generally define a relative surface normal angle at which angular color dependency may be analyzed and modeled for the 3D printing device. Therefore, in some examples, a plurality of test angles may be determined for the 3D printing device to facilitate such angular color dependency analysis and modeling. For example, a plurality of test angles may comprise incremental angle values from 0° to 90°, incremental angle values from 0° to 180°, or other such angle ranges. In a particular example, the test angles may comprise test angles from 0° to 90° in 10° increments. As will be appreciated, the angle values of such test angles may be relatively defined and/or based on a predefined positioning system associated with the 3D printing device, a 3D test object support mechanism, one or more color measurement devices, and/or a computing system for analyzing a 3D test object. As will be appreciated, generally, a greater number of different test angles may facilitate a more accurate modeling of color angular dependency for a given color and/or 3D printing device. Similarly, a lesser number of different test angles may facilitate a more processing resource efficient modeling of color angular dependency for a given color and/or 3D printing device.

The example computing device further determines a test object size based at least in part on the 3D printing specifications and/or the test angles (block 406), and the computing device determines a test surfaces for the test object based at least in part on the 3D printing specifications and/or the test angles (block 408) (e.g., a number of test surfaces and a size of each test surface). The computing device further determines a color area for each test color for each test surface of the test object (block 410) based at least in part on the test angles, test object size, test surfaces, and/or 3D printing specifications. The example computing device generates the test object based at least in part on the test angles, test object size, test surfaces, color area for each test color for each test surface, and/or the 3D printing specifications (block 412), and the computing device may output the test object to the 3D printing device to thereby generate a printed 3D test object (block 414). Generally, the printed 3D test object may be utilized for color calibration of the 3D printing device. Examples of color calibration for a 3D printing device may include compensation for angular color dependency that may occur for the 3D printing device.

As described with regard to the flowchart 400 of FIG. 4, a test object for the 3D printing device may be determined based on the 3D printing specifications. Furthermore, the number and orientation of test angles, test surfaces, and the overall test object may be related such that the determination of each may be based at least in part on the others. In addition, while examples described herein generally indicate the generation of one test object, other examples are not so limited. In some examples, a computing system may generate more than one related test object. For example, a computing system may determine a test object for each test color. In other examples, test surfaces of a test object may be subdivided into multiple color areas each configured with a respective test color. In some examples, various possible test objects may be stored based on characteristics of test angles (e.g., number of test angles, relative angular value of each test angle, etc.). In such examples, a test object may be generated based at least in part on such possible test objects.

FIG. 5 provides a flowchart 500 that illustrates an example sequence of operations that may be performed by a computing device to generate and/or store 3D color calibration data for a 3D printing device. In this example, the computing system collects color measurement data (block 502). Examples may collect color measurement data from a printed test object with one or more color measurement devices. As described previously, a printed test object is generally a 3D object printed by the 3D printing device. Furthermore, a printed test object generally comprises a plurality of test surfaces positioned at various test angles. Each test surface may be configured with one or more test colors. As will be appreciated, due to angular color dependency, the test colors may vary in visual appearance on different test surfaces. The computing system receives the color measurement data (block 504) collected for the printed test object, and the computing system analyzes the color measurement data to determine color values associated with a test color at test angles of the printed test object (block 506). For example, if a test object comprises test angles 90°, 135°, and 180° for a particular test color, the computing system may determine a color value for each angle associated with the test color.

Based on the color values determined for test angles associated with the test colors, the computing system determines whether angular color dependency occurs for any test color (block 508). In some examples, a computing device may determine that angular color dependency occurs for a respective test color if color values at test angles vary more than a predefined threshold. Generally, the predefined threshold may correspond to a tolerance within which color values may be considered approximately uniform. As will be appreciated, sight color differences within the predefined threshold may be visually imperceptible. In addition, the predefined threshold may be different for different 3D printing devices, different colors, etc. In some examples, the predefined threshold may further compensate for slight measurement differences in the color measurement data that may be based on measurement accuracy and tolerances associated with color measurement devices used to collect the color measurement data.

If the computing system determines that angular color dependency does not occur for any test colors ("N" branch of block 508), the computing system may end the process (block 510) since color calibration may not be needed. In response to determining that angular color dependency occurs for at least one test color ("Y" branch of block 508), the computing system determines angular color dependency characteristics for the test colors (block 512) determined to have angular color dependency. Generally, the angular color dependency characteristics for a particular test color may indicate a variance in the test color at given test angles. Furthermore, determining the angular color dependency characteristics may comprise analyzing the color measurement data collected for a test color at each of a plurality of test colors to determine a variance in the color value at each test angle relative to an expected color value or relative to a reference color value for a particular reference test angle. For example, a printed test object may comprise a first test surface positioned at a test angle of 0° and configured with a first test color. In this example, the color measurement data collected for the first test color from the first test surface may be analyzed to determine a color value for the 0° test angle, and the color value at the 0° test angle may be the reference color value. Continuing the example, color values at other test angles of the printed test object for the first test color may be determined from color measurement data, and the color values at the other test angles may be analyzed based on the reference color value to determine whether angular color dependency occurs and/or angular color characteristics for the first test color.

The computing system generates 3D color calibration data for one or more test colors (block 514) for which angular color dependency is determined to occur. In general, the 3D color calibration data comprises angular variation information for a particular color. In some examples, the 3D color calibration data may indicate variation of respective colors at a set of angles. In other examples, the 3D color calibration data may comprise a modeled variation as a function of angular positioning for respective colors. Generally, operation of the 3D printing device may be controlled based on 3D color calibration data such that an amount of printing material associated with a particular color may be adjusted based on the angular variation information of the 3D color calibration data and the orientation of the 3D object. The amount of printing material may be adjusted to compensate for angular color dependency of the particular color based on the angular variance information such that printing with the printing material in a 3D printing process may form a 3D object having approximately uniform appearance of the particular color where appropriate at various surface orientations. In some examples, the computing system may store the 3D color calibration data in a memory resource (block 516), and the process may end (block 510).

In general, the 3D color calibration data may be used to control a 3D printing device during printing of objects. In some examples, the 3D color calibration data may be used to monitor a printing process of the 3D printing device. In such examples, color measurement data may be collected from printed test objects generated by the 3D printing device at various times, and color calibration data determined for each printed test object may be compared to determine whether variation in one or more colors occurs as the 3D printing device generates 3D printed objects. For example, referring to FIG. 6, this figure provides a flowchart 600 that illustrates an example sequence of operations that may be performed by an example computing system. In this example, the computing system receives color measurement data (block 602) collected from a test object having a plurality of test surfaces positioned at a plurality of test angles, where each test surface is configured with one or more test colors. The computing system analyzes the color measurement data to determine angular color dependency characteristics for each of the one or more test colors, and the computing system generates 3D color calibration data based on the color dependency characteristics (block 606).

In this example, the computing system determines a color variation in a printing process of the 3D printing device based at least in part on the 3D color calibration data (block 608). As will be appreciated, the 3D color calibration data may be first 3D color calibration data, and the first 3D color calibration data may be compared to second 3D color calibration data collected from another test object generated by the printing process of the 3D printing device (which may be a production object) to determine color variation in the printing process. In such examples, the computing device may control the 3D printing device based at least in part on the determined color variation (block 610) during printing of production parts. Therefore, in such examples, the printing process of the 3D printing device is monitored at intervals by analyzing more than one test object (or production objects), and the printing process of the 3D printing device may be adjusted based on determined color variation to thereby maintain an approximately uniform color appearance in 3D objects generated with the 3D printing device.

Figure 7A:
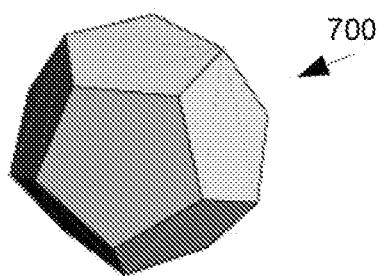
Figure 7B:
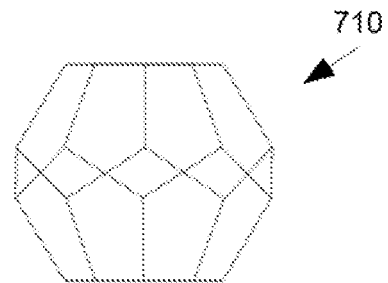
Figure 7C:
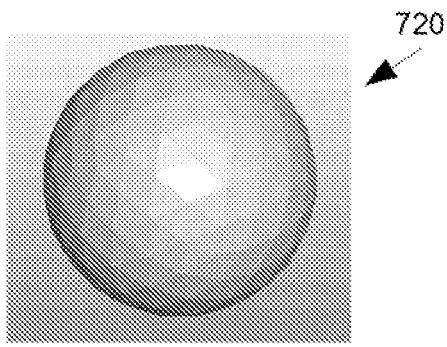
Figure 7D:
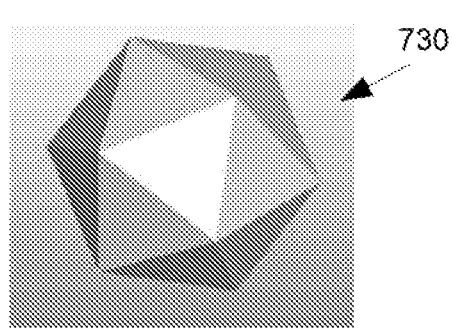
Figure 7E:
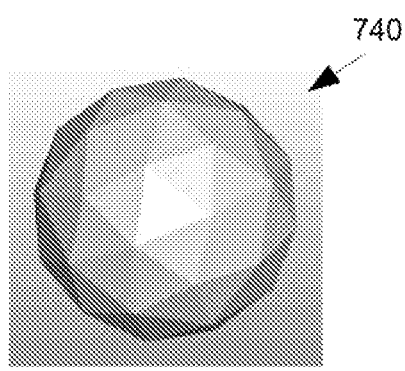

FIGS. 7A-G provide diagrammatic illustrations of various example test objects that may be generated and/or analyzed by some examples. FIG. 7A illustrates an example 12-faced (i.e., 12 test surfaces) test object 700. In this example, the test object 700 may be scaled in various dimensions to adjust angles of orientation (i.e., test angles) of the test surfaces. FIGS. 7B-E provide example test objects 710-740 comprising additional numbers of test surfaces and test angles. As will be appreciated, in each example, a test surface may be configured with more than one test color.

Figure 7F:
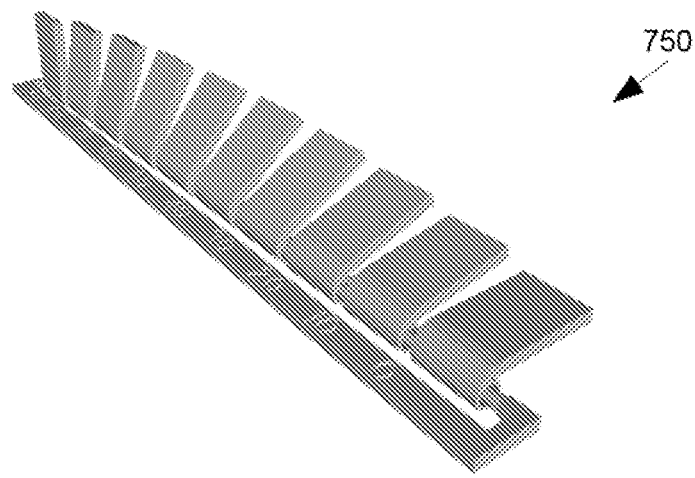

FIG. 7F similarly comprises an example test object 750 comprising 10 test surfaces positioned at 10 test angles (which are illustrated as 0°-90° at 10° increments). Generally, each test surface of the example test object 750 of FIG. 7F may be movable between a test angle position corresponding to the respective test angle (in this example 0°-90° at 10° increments) and a measurement angle position. Generally, the test angle position may correspond to printing of the test surface, and the measurement angle position may correspond to measurement of the test surface to collect color measurement data.

Figure 7G:
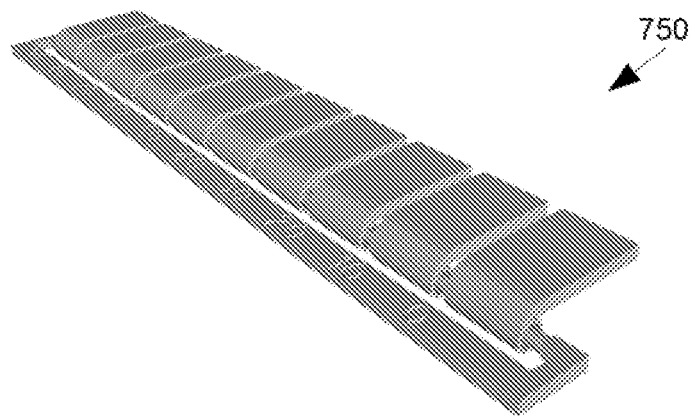

In the example of FIG. 7F, the test surfaces may be positioned at the test angles (e.g., 0°-90° at 10° increments) during 3D printing, and the test surfaces may be positioned at the measurement angle position during the collection of color measurement data. In examples such as the example test object of FIG. 7F, the measurement angle position may facilitate faster collection of measurement data, as each test surface may be moved to a common relative position (e.g., each test surface may be parallel). As will be appreciated, in some examples, movement of the test surfaces to a common relative position (e.g., a measurement angle position) may facilitate simultaneous measurement of some or all of the test surfaces for the collection of the color measurement data. FIG. 7G provides a diagrammatic illustration of the example test object 750 of 7F where the test surfaces have been moved to a measurement angle position. In this example, the test surfaces have been moved to a relative 0° angle. In such examples, color measurement data may be collected from each test surface of a printed test object when the test surfaces are positioned at the measurement angle position.

FIG. 8A provides a diagrammatic illustration of an example test object 800 that includes two test colors on each test surface (illustrated with hatching marks). FIG. 8B provides a diagrammatic illustration of an example test surface 810 configured with four test colors. As will be appreciated, a number of test colors configured on a particular surface may be based at least in part on specifications associated with a color measurement device with which a test object may be analyzed. For example, a test surface may be configured with a number of test colors based at least in part on a minimum detection area associated with a color measurement device.

FIG. 8C provides a diagrammatic illustration of an example test object 820 that includes a plurality of test surfaces positioned at a plurality of test angles, where some of the test surfaces are configured with more than one test color. In some examples that utilize test objects similar to the example test object 820, the test object may be rotated about one or more axes to position each test surface for the collection of color measurement data by one or more color measurement devices. In other examples that utilize test objects similar to the test object 820, the example test object may be moved along one or more axes to position each test surface for the collection of color measurement data by one or more color measurement devices. In other examples that utilize test objects similar to the test object 820, one or more color measurement devices may be moved along one or more axis to thereby position the one or more color measurement devices to collect color measurement data from the test surfaces.

It will be appreciated that the example test object 820 of FIG. 8C illustrates an example test object having a plurality of test surfaces configured on a surface of the test object 820. Generally, the test objects and test surfaces of FIGS. 7A-G and 8A-C are examples, and other examples are contemplated hereby. For example, the various configurations of test surfaces, test angles, and/or test colors illustrated in the examples provided in FIGS. 7A-G and FIGS. 8A-C may be combined to implement some examples. Moreover, the test objects and/or color measurement devices may be rotated, moved, and/or otherwise manipulated to facilitate the collection of color measurement data and the angular color dependency characterization of a 3D printing device. Generally, computing systems (such as the computing systems of FIGS. 1A, 1B, 2A, 2B, and/or 3) may control the rotation, movement, and/or other such manipulation concurrent with the collection of color measurement data.

Generally, the description generally refers to a test color or more than one test color. Based on the angular color dependency analysis of such test color or more than one test color, examples may generate color calibration data associated with each test color and combinations of each test color. In some examples, test colors of test objects may correspond to primary colors of the 3D printing device, and the color calibration data may facilitate color calibration for the primary colors and combinations of the primary colors (e.g., secondary colors). In some examples, test colors of test objects may be one or more primary colors and/or one or more secondary colors. Generally, the test colors for color calibration may be application specific, where the test colors may be defined by user input and/or determined based at least in part on 3D printing specifications.

Therefore, examples described herein generally facilitate color calibration for a 3D printing device. Furthermore, some examples, may generate test objects that may be output to a 3D printing device to generate printed test objects. The color measurement data collected from the printed test objects may facilitate angular color dependency analysis for one or more colors for a 3D printing device. Based on the angular color dependency analysis, examples may generate color calibration data that may be used to control printing of the 3D printing device to thereby effect angular color dependency compensated printing with the 3D printing device. As will be appreciated, compensation of angular color dependency in 3D printing may address non-uniform color issues associated with some 3D printing devices and processes. Moreover, some examples provided herein may monitor a printing process of the 3D printing device based on the color calibration data. In such examples, color variation in the 3D printing process may be detected and reduced.

While various examples are described herein, elements and/or combinations of elements may be combined and/or removed for various examples contemplated hereby. For example, the example operations provided herein in the flowcharts of FIGS. 4-6 may be performed sequentially, concurrently, or in a different order. Moreover, some example operations of the flowcharts may be added to other flowcharts, and/or some example operations may be removed from flowcharts. Furthermore, in some examples, various components of the example computing systems of FIGS. 1-3 may be removed, and/or other components may be added. Similarly, in some examples various instructions of the example memories and/or machine-readable storage mediums (such as the machine-readable storage medium of FIG. 1 and/or the memory resource 220 of FIG. 2) may be removed, and/or other instructions may be added (such as instructions corresponding to the example operations of FIGS. 4-6).

The preceding description has been presented to illustrate and describe examples of the principles described. This description is not intended to be exhaustive or to limit examples to any precise form disclosed. Many modifications and variations are possible in light of this description.

The invention claimed is:

1. A non-transitory machine-readable storage medium comprising instructions executable by a processing resource of a computing system to cause the computing system to:

receive three-dimensional printing specifications associated with a three-dimensional production object to be printed by a three-dimensional printing device via dispensing a build material and a binding material in a print bed in a layer-wise additive manufacturing process;

analyze the three-dimensional printing specifications to determine a plurality of test angles for a test object and a plurality of test surfaces corresponding to the test angles for the test object;

generate the test object for color calibration for the three-dimensional printing device that has the plurality of test angles and the plurality of test surfaces, each test surface of the test object configured with at least one test color;

analyze the test object to determine a color dependency of the at least one test color of the plurality of test surfaces at the plurality of test angles;

determine an amount of printing material associated with the at least one test color; and print the three-dimensional production object with the amount of printing material associated with the at least one test color for surfaces of the three-dimensional production object that are printed at the plurality of test angles that are determined to have the color dependency.

2. The non-transitory machine-readable storage medium of claim 1, wherein the three-dimensional printing specifications associated with the three-dimensional printing object comprises dimensions of the three-dimensional production object.

3. The non-transitory machine-readable storage medium of claim 1, wherein the three-dimensional printing specifications associated with the three-dimensional printing object comprises colors of the three-dimensional production object.

4. The non-transitory machine-readable storage medium of claim 1, wherein the three-dimensional printing specifications associated with the three-dimensional printing object comprises a composition of the build material used to print the three-dimensional production object.

5. The non-transitory machine-readable storage medium of claim 1, wherein the plurality of test surfaces of the test object are movable to the different test angles.

6. The non-transitory machine-readable storage medium of claim 1, wherein the plurality of test angles comprise incremental angle values from 0 degrees to 90 degrees.

7. A non-transitory machine-readable storage medium comprising instructions executable by a processing resource of a computing system to cause the computing system to:

receive three-dimensional printing specifications to print a test object on a three-dimensional printing device, wherein the three-dimensional printing specifications comprise a size and dimensions of a production object to be printed, test angle information, test surface information, and test color information;

analyze the three-dimensional printing specifications to determine a plurality of test angles for the test object and a plurality of test surfaces corresponding to the test angles for the test object;

generate the test object for color calibration for the three-dimensional printing device that has the size of the production object, the plurality of test angles and the plurality of test surfaces, each test surface of the test object configured with at least one test color;

analyze the test object to determine a color dependency of the at least one test color of the plurality of test surfaces at the plurality of test angles;

determine an amount of printing material associated with the at least one test color; and print the production object with the amount of printing material associated with the at least one test color for surfaces of the production object that are printed at the plurality of test angles that are determined to have the color dependency.

8. The non-transitory machine-readable storage medium of claim 7, wherein the test angle information comprises at least one of: a number of test angles or a relative orientation of the test angles.

9. The non-transitory machine-readable storage medium of claim 7, wherein the test surface information comprises a size of a test surface.

10. The non-transitory machine-readable storage medium of claim 7, wherein the test color information comprises at least one of: a number of test colors or an angular orientation of the test colors.

11. The non-transitory machine-readable storage medium of claim 7, wherein the plurality of test angles comprise incremental angle values from 0 degrees to 180 degrees.

* * * * *